(12) United States Patent
Bill et al.

(10) Patent No.: US 7,266,609 B2
(45) Date of Patent: Sep. 4, 2007

(54) GENERATING MULTIPLE DATA STREAMS FROM A SINGLE DATA SOURCE

(75) Inventors: David S. Bill, San Francisco, CA (US); Gilbert G. Weigand, Ashburn, VA (US); Scott K. Brown, Marietta, GA (US); William J. Raduchel, Palo Alto, CA (US); Christopher L. Amen-Kroeger, Oakland, CA (US)

(73) Assignee: AOL LLC, Dulles, VA (US)

( * ) Notice: Subject to any disclaimer, the term of this patent is extended or adjusted under 35 U.S.C. 154(b) by 1036 days.

(21) Appl. No.: 09/893,692

(22) Filed: Jun. 29, 2001

(65) Prior Publication Data

US 2002/0161910 A1 Oct. 31, 2002

Related U.S. Application Data

(60) Provisional application No. 60/286,964, filed on Apr. 30, 2001.

(51) Int. Cl.
*G06F 15/16* (2006.01)
*H04L 12/28* (2006.01)
*H04L 12/56* (2006.01)

(52) U.S. Cl. .................. 709/231; 709/236; 709/245; 370/390

(58) Field of Classification Search ............... 370/390, 370/428, 432; 709/231, 245, 236
See application file for complete search history.

(56) References Cited

U.S. PATENT DOCUMENTS

| 4,872,160 | A | 10/1989 | Hemmady et al. |
|---|---|---|---|
| 5,283,639 | A | 2/1994 | Esch et al. |
| 5,493,568 | A | 2/1996 | Sampat et al. |
| 5,583,561 | A | 12/1996 | Baker et al. |
| 5,600,646 | A | 2/1997 | Polomski |
| 5,604,542 | A | 2/1997 | Dedrick |
| 5,689,641 | A | 11/1997 | Ludwig et al. |
| 5,774,660 | A | 6/1998 | Brendel et al. |
| 5,799,002 | A | 8/1998 | Krishnan |
| 5,802,301 | A | 9/1998 | Dan et al. |
| 5,809,237 | A | 9/1998 | Watts et al. |
| 5,815,662 | A | 9/1998 | Ong |
| 5,838,912 | A | 11/1998 | Poon et al. |
| 5,841,763 | A | 11/1998 | Leondires et al. |

(Continued)

FOREIGN PATENT DOCUMENTS

GB 2 309 849 A * 2/1966

(Continued)

OTHER PUBLICATIONS

Keller et al., An Active Router Architecture for Multicast Video Distribution, St. Louis, Missouri.

(Continued)

*Primary Examiner*—Patrice L. Winder
(74) *Attorney, Agent, or Firm*—Fish & Richardson P.C.

(57) ABSTRACT

A switch having a first communications interface to receive a stream of data units, a buffer to store the payload portion of the data unit, a replicator to duplicate at least the payload portion of the data unit, and a second communications interface to enable access to the stream of data units by two or more terminals.

56 Claims, 4 Drawing Sheets

U.S. PATENT DOCUMENTS

| | | | |
|---|---|---|---|
| 5,867,502 | A | 2/1999 | Chang |
| 5,872,588 | A | 2/1999 | Aras et al. |
| 5,913,062 | A | 6/1999 | Vrvilo et al. |
| 5,935,245 | A | 8/1999 | Sherer |
| 5,946,614 | A | 8/1999 | Robbins et al. |
| 5,973,722 | A | 10/1999 | Wakai et al. |
| 6,011,782 | A | 1/2000 | DeSimone et al. |
| 6,052,805 | A | 4/2000 | Chen et al. |
| 6,061,349 | A | 5/2000 | Coile et al. |
| 6,097,720 | A | 8/2000 | Araujo et al. |
| 6,101,187 | A | 8/2000 | Cukier et al. |
| 6,119,163 | A | 9/2000 | Monteiro et al. |
| 6,141,336 | A | 10/2000 | Bauchot et al. |
| 6,151,621 | A | 11/2000 | Colyer et al. |
| 6,151,632 | A | 11/2000 | Chaddha et al. |
| 6,157,635 | A | 12/2000 | Wang et al. |
| 6,173,314 | B1 | 1/2001 | Kurashima et al. |
| 6,189,039 | B1 | 2/2001 | Harvey et al. |
| 6,195,680 | B1 | 2/2001 | Goldszmidt et al. |
| 6,201,859 | B1 | 3/2001 | Memhard et al. |
| 6,226,686 | B1 * | 5/2001 | Rothschild et al. ......... 709/245 |
| 6,259,701 | B1 | 7/2001 | Shur et al. |
| 6,266,335 | B1 | 7/2001 | Bhaskaran |
| 6,298,129 | B1 | 10/2001 | Culver et al. |
| 6,327,622 | B1 | 12/2001 | Jindal et al. |
| 6,347,090 | B1 * | 2/2002 | Ooms et al. ................ 370/428 |
| 6,363,075 | B1 | 3/2002 | Huang et al. |
| 6,363,429 | B1 | 3/2002 | Ketcham |
| 6,370,112 | B1 | 4/2002 | Voelker |
| 6,377,996 | B1 | 4/2002 | Lumelsky et al. |
| 6,381,746 | B1 | 4/2002 | Urry |
| 6,404,745 | B1 | 6/2002 | O'Neil et al. |
| 6,415,312 | B1 | 7/2002 | Boivie |
| 6,415,323 | B1 | 7/2002 | McCanne et al. |
| 6,418,214 | B1 | 7/2002 | Smythe et al. |
| 6,434,622 | B1 | 8/2002 | Monteiro et al. |
| 6,437,830 | B1 | 8/2002 | Horlander |
| 6,457,043 | B1 | 9/2002 | Kwak et al. |
| 6,466,550 | B1 | 10/2002 | Foster et al. |
| 6,490,285 | B2 | 12/2002 | Lee et al. |
| 6,510,553 | B1 | 1/2003 | Hazra |
| 6,516,350 | B1 | 2/2003 | Lumelsky et al. |
| 6,625,773 | B1 * | 9/2003 | Boivie et al. ............... 370/432 |
| 6,646,997 | B1 | 11/2003 | Baxley et al. |
| 6,665,726 | B1 * | 12/2003 | Leighton et al. ............ 709/231 |
| 6,708,213 | B1 * | 3/2004 | Bommaiah et al. ......... 709/231 |
| 6,711,212 | B1 | 3/2004 | Lin |
| 6,728,356 | B1 | 4/2004 | Carroll |
| 6,728,784 | B1 | 4/2004 | Mattaway |
| 6,751,219 | B1 * | 6/2004 | Lipp et al. .................. 370/390 |
| 6,785,704 | B1 | 8/2004 | McCanne |
| 6,847,618 | B2 | 1/2005 | Laursen et al. |
| 6,850,707 | B1 | 2/2005 | Chang et al. |
| 6,873,627 | B1 | 3/2005 | Miller et al. |
| 6,879,565 | B2 | 4/2005 | Baxley et al. |
| 2002/0026482 | A1 | 2/2002 | Morishige et al. |
| 2002/0031126 | A1 | 3/2002 | Crichton et al. |
| 2002/0093963 | A1 | 7/2002 | Roullet et al. |
| 2002/0103864 | A1 | 8/2002 | Rodman et al. |
| 2002/0112004 | A1 | 8/2002 | Reid et al. |
| 2002/0112069 | A1 | 8/2002 | Sim |
| 2002/0114302 | A1 | 8/2002 | McDonald et al. |
| 2002/0116532 | A1 | 8/2002 | Berg |
| 2002/0161847 | A1 | 10/2002 | Weigand et al. |
| 2002/0161910 | A1 | 10/2002 | Bill et al. |
| 2004/0025186 | A1 | 2/2004 | Jennings et al. |
| 2005/0010653 | A1 | 1/2005 | McCanne |

FOREIGN PATENT DOCUMENTS

| | | |
|---|---|---|
| WO | WO 96/38961 | 12/1996 |
| WO | WO96/38961 | * 12/1996 |

OTHER PUBLICATIONS

Lockwood et al., Reprogrammable Network Packet Processing on the Field Programmable Port Extender (FPX), 2001, St. Louis, Missouri.

Taylor et al., Dynamic Hardware Plugins(DHP): Exploiting Reconfigurable Hardware for High-Perofrmance Programmble Routers, 2002, St. Louis, Missouri.

Choi et al., Design of a Flexible Open Platform for High Performance Active Networks, 1999, St. Louis Missouri.

PCT International Search Report, Apr. 8, 2003, 6 pages, PCT/US02/41769.

International Search Report dated Jul. 2, 2003 (Appln. No. PCT/US03/12086).

International Preliminary Examination Report (IPER), dated Feb. 24, 2004, Appln. No. PCT/US02/13362.

F. Gong: Multipoint audio and video control for packet-based multimedia conferencing (1994),International Multimedia Conference, pp. 425-432, ISBN:0-89791-686-7.

Office Action, U.S. Appl. No. 10/090,727, filed May 10, 2005.

Office Action, U.S. Appl. No. 10/134,439, filed Jul. 25, 2005.

Office Action, U.S. Appl. No. 10/134,552, dated Oct. 11, 2005.

Chinese Office Action mailed Aug. 12, 2005 in Application No. 02810729.2.

* cited by examiner

FIG. 2B Structure of Data Unit

GENERATING MULTIPLE DATA STREAMS FROM A SINGLE DATA SOURCE

This application claims the benefit of U.S. Provisional Application No. 60/286,964 filed Apr. 30, 2001, which is incorporated by reference.

TECHNICAL FIELD

This invention relates to streaming media.

BACKGROUND

Multimedia streaming generally describes a process for allowing access to streamed multimedia content provided by or originating from one or more sources. Increased usage of the Internet has resulted in an increased demand for multimedia streaming and a corresponding need for cost effective multimedia communications solutions.

SUMMARY

In one general aspect, performance of a network system may be improved by a switch that includes a communications interface to receive a stream of data units that each include a payload portion and an attribute portion, a buffer structured and arranged to store at least payload portions of the data units, a replicator structured and arranged to duplicate at least the payload portion of one or more of the data units, and a second communications interface structured and arranged to enable access to the stream of data units by two or more terminals.

Implementations may include one or more of the following features. For example, the attribute portions of the data units may include IP packet information and/or one or more pieces of layer three information. The switch may include a processor that generates and associates an attribute portion with a payload portion that has been duplicated by the replicator. The replicator may be structured and arranged to duplicate the payload portion of the attribute portion, and the processor may be structured and arranged to change an IP header on one or more of the attribute portions duplicated by the replicator.

The processor may be structured and arranged to change an IP destination address, which may be, for example, the IP address corresponding to the terminal to which access to the payload portion is enabled using a second communications interface. The processor may be structured and arranged to specify destination information that differs among duplicated payload portions. The data unit may include, for example, audio, video, and streamed media content.

The switch may be structured and arranged to receive a request to receive a stream of data units from a terminal. The switch then may transmit the stream of data units to the requesting terminal. Implementations may include receiving the request from a device other than the terminals that will receive a stream of data units, and the switch may transmit a stream of data units to the requesting terminals or devices. The switch may enable access to the same stream of data units at two different temporal offsets. The switch may include a buffer with more than one pointer to enable access to the stream of data units at two different points and times. The buffer may store more than one instance of the stream of data units.

A source system may interface with the switch. The source system may be capable of duplicating data units and may transmit a stream of data units to the switch. Likewise, one or more terminals may interface with the switch and may receive duplicated data units from the switch.

Implementations may include a system capable of achieving the above features, including, for instance, a source system, a switch, a terminal, and a network between these components. Implementations also may include a sequence of steps performed on the switch, the source system and/or the terminal to achieve these features.

Other features and advantages will be apparent from the following description, including the drawings, and the claims.

DETAILED DESCRIPTION

For illustrative purposes, FIGS. 1–4 describe a communications system for implementing techniques for streaming data units. For brevity, several elements in the figures described below are represented as monolithic entities. However, as would be understood by one skilled in the art, these elements each may include numerous interconnected computers and components configured to perform a set of specified operations and/or dedicated to a particular geographical region.

Figure 1:
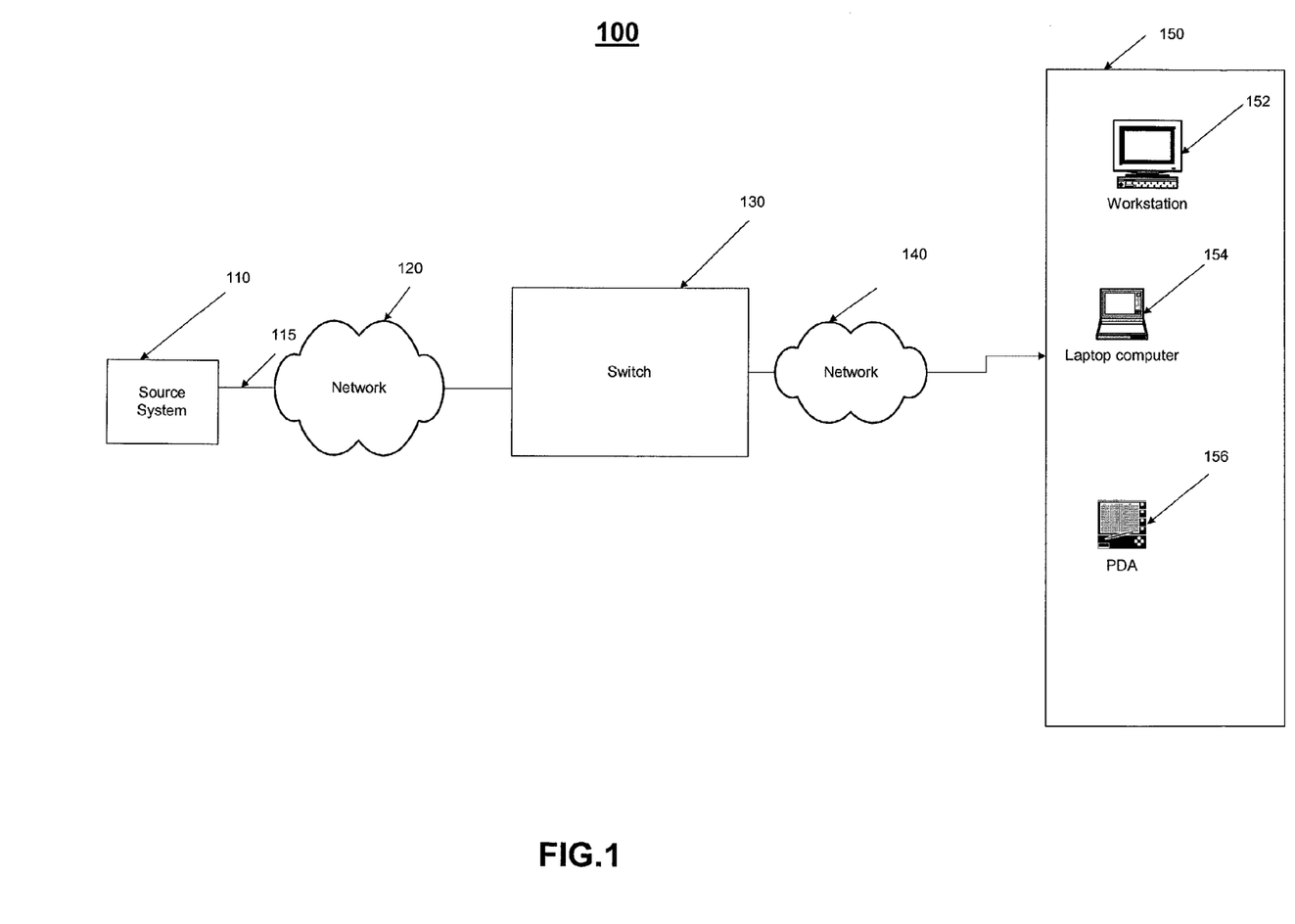
FIG. 1 is a block diagram illustrating a communications system operable to use a switch to generate multiple streams of data units from a single data source.

Referring to FIG. 1, communications system 100 may be structured and arranged with a source system 110, two or more terminals 150 and communication software and hardware that enable communications between source system 110 and terminals 150. More particularly, the communications system 100 typically includes the source system 110, a network 120, a switch 130, a network 140 and terminals 150. As will be described in greater detail with respect to FIG. 3, the source system 110 generally transmits one or more data units in a stream of data units across network 120 to one or more switches 130, where data units or portions of data units, are duplicated and transmitted to two or more terminals 150 through network 140.

Typically, a source system 110 may be structured and arranged to convert a media source (e.g., a video or audio feed) into data units for transmission across a network 120. The source system 110 may include a general-purpose computer having a central processor unit (CPU), and memory/storage devices that store data and various programs such as an operating system and one or more application programs. Other examples of a source system 110 include a workstation, a server, a device, a special purpose device or component, a broadcast system, other equipment, or some combination thereof capable of responding to and executing instructions in a defined manner. The source system 110 also typically includes an input/output (I/O) device (e.g., one or more devices having video and audio input and conversion capability), and peripheral equipment such as a display communications card or device (e.g., a modem or a network adapter) for exchanging data with the network 120.

A communications link 115 is used to communicate data between source systems 110 and network 120. Communications link 115 may include, for example, a telephone line, a wireless network link, a cable network, or a direct connection.

The network 120 typically includes hardware and/or software capable of enabling direct or indirect communications between the sending system 110 and the switch 130. The network 120 may include a direct link between the source system 110 and the switch 130, or it may include one or more networks or subnetworks between them (not explicitly shown). Each network or subnetwork may include, for example, a wired or wireless data pathway capable of carrying and receiving data. Examples of network 120 include the Internet, the World Wide Web, a WAN ("Wide Area Network"), a LAN ("Local Area Network"), an analog or a digital wired and wireless telephone network (e.g., a PSTN ("Public Switched Telephone Network"), an ISDN ("Integrated Services Digital Network"), or a xDSL ("any form of Digital Subscriber Loop")), and/or a radio, television, cable, satellite, or any other delivery mechanism for carrying data.

The switch 130 typically is structured and arranged to receive the stream of data units from the source system 110, to duplicate the stream of data units, and to transmit a stream of duplicated data units to one or more terminals 150.

In some implementations, the switch 130 is structured and arranged to perform filtering and forwarding between different domains at the same level of the protocol stack in the OSI ("Open System Interconnection") reference model. For example, in some networks, switch 130 may forward Ethernet frames between different Ethernet segments. In another example, switch 130 may forward IP packets between different IP subnets.

Generally, switch 130 includes a device that performs network operations and functions in hardware (e.g., a chip or part of chip). In some implementations, the device may include an ASIC ("Application Specific Integrated Circuit") implementing network operations logic directly on a chip (e.g., logical gates fabricated on a silicon wafer then manufactured into a chip). For example, an ASIC chip may perform filtering by receiving a packet, examining the IP address of the received packet, and filtering based on the IP address by implementing a logical gate structure in silicon.

Implementations of the device included in the switch 130 may use a Field Programmable Gate Array (FPGA). A FPGA is generally defined as including a chip or chips fabricated to allow third party designers to implement a variety of logical designs (e.g., group of gates) on the chip. For example, a third party designer may load a design within a FPGA to replace the received IP addresses with different IP addresses, or may load a design within the FPGA to segment and reassemble IP packets as they are modified while being transmitted through different networks.

Implementations of the device included in the switch 130 may include a network processor. A network processor is generally defined to include a chip or chips for allowing software to specify which network operations will be performed. A network processor may perform a variety of operations. One example of a network processor may include several interconnected RISC ("Reduced Instruction Set Computer") processors fabricated in a network processor chip. The network processor chip may implement software on some of the RISC processors to change an IP address of an IP packet. Other RISC processors in the network processor may implement software that determines which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets; however, a network processor and ASIC are generally capable of performing the same operation.

Data units handled by switch 130 may be accessed by or sent to terminals 150 through network 140. As such, network 140 is structured and arranged to receive data units transmitted from the switch 130 for transmission to the terminals 150.

The network 140 may include hardware and/or software capable of enabling direct or indirect communications between the switch 130 and the terminal 150. As such, the network 140 may include a direct link between the switch 130 and the terminal 150, or it may include one or more networks or subnetworks between them (not shown). Each network or subnetwork may include, for example, a wired or wireless data pathway capable of carrying and receiving data. Examples of the delivery network include the Internet, the World Wide Web, WANs, LANs, analog or digital wired and wireless telephone networks (e.g., PSTN, ISDN, or xDSL), radio, television, cable, satellite, and/or any other delivery mechanism for carrying data. Network 120 and network 140 may share one or more hardware or software devices.

The terminal 150 may include one or more devices capable of receiving the stream of data units transmitted by switch 130 through network 140. The terminal 150 may include a controller (not shown) that processes instructions received from or generated by a software application, a program, a piece of code, a device, a computer, a computer system, or a combination thereof, to direct operations of the terminal 150. The instructions may be embodied permanently or temporarily in any type of machine, component, equipment, storage medium, or propagated signal that is capable of being delivered to the terminal 150 or that may reside with the controller at the terminal 150. The terminal 150 may include a general-purpose computer (e.g., a personal computer) capable of responding to and executing instructions in a defined manner, a workstation 152, a laptop 154, a PDA ("Personal Digital Assistant") 156, a wireless phone, a component, other equipment, or some combination of these items that is capable of responding to and executing instructions.

For instance, in one implementation, the terminal 150 includes one or more information retrieval software applications (e.g., a browser, a mail application, an instant messaging client, an Internet service provider client, or an AOL TV or other integrated client) capable of receiving one or more data units. The information retrieval applications may run on a general purpose operating system and a hardware platform that includes a general purpose processor and specialized hardware for graphics, communications and/or other capabilities. In another implementation, terminal 150 may include a wireless telephone running a microbrowser application on a reduced operating system with general purpose and specialized hardware capable of operating in mobile environments.

Figure 2A:
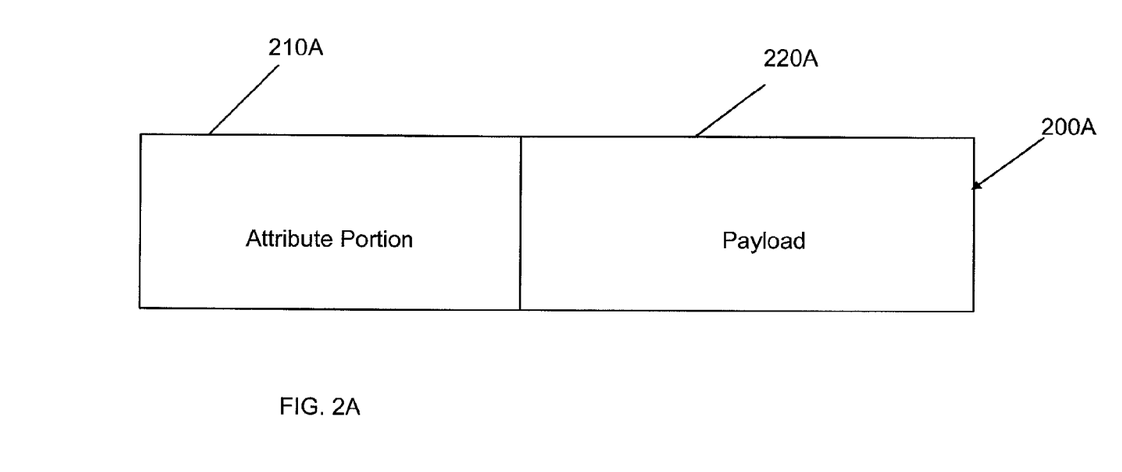
FIG. 2A is a diagram of an exemplary data unit that may be transmitted in a communications system, such as that shown in FIG. 1.

Referring to FIG. 2A, an example of a data unit 200A includes an attribute portion 210A and a payload 220A. The attribute portion 210A typically includes parameters that are modified as the data unit 200A moves through the communications system 100. For example, an IP data unit may change the layer two addressing information as the data unit moves through the network (e.g., network 140). The payload 220A typically includes information including content and/or parameters that are intended for communication from the source system and tend to change infrequently during transmission to preserve integrity of the data being transmitted. For example, the payload 220A may include audio or video content being transmitted to a personal computer (e.g., terminal 150).

Figure 2B:
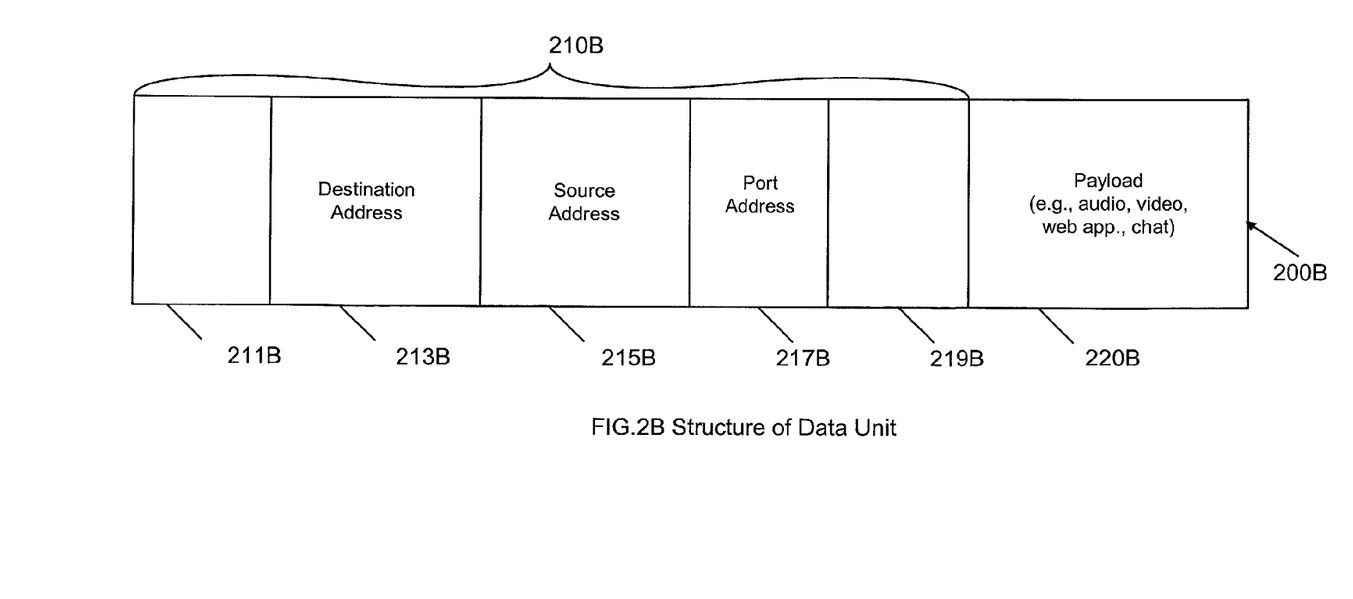
FIG. 2B is a diagram illustrating one example of the structure of an attribute portion of the data unit of FIG. 2A.

Referring to FIG. 2B, the attribute portion 210B of the data unit 200B may include several distinct or intermingled fields, such as, for example, fields of an IP ("Internet Protocol") packet. More particularly, for example, attribute portion 210B may include a destination address 213B, a source address 215B, a port number 217B indicating the type of IP traffic (e.g., UDP ("User Data Protocol"), TCP ("Transmission Control Protocol"), ICMP ("Internet Control Message Protocol")), and other parameters at various portions as represented by 211B and 219B. These fields may be arranged as shown or otherwise to accommodate various protocols. The payload in the IP data unit 200B is represented by 220B.

Figure 3:
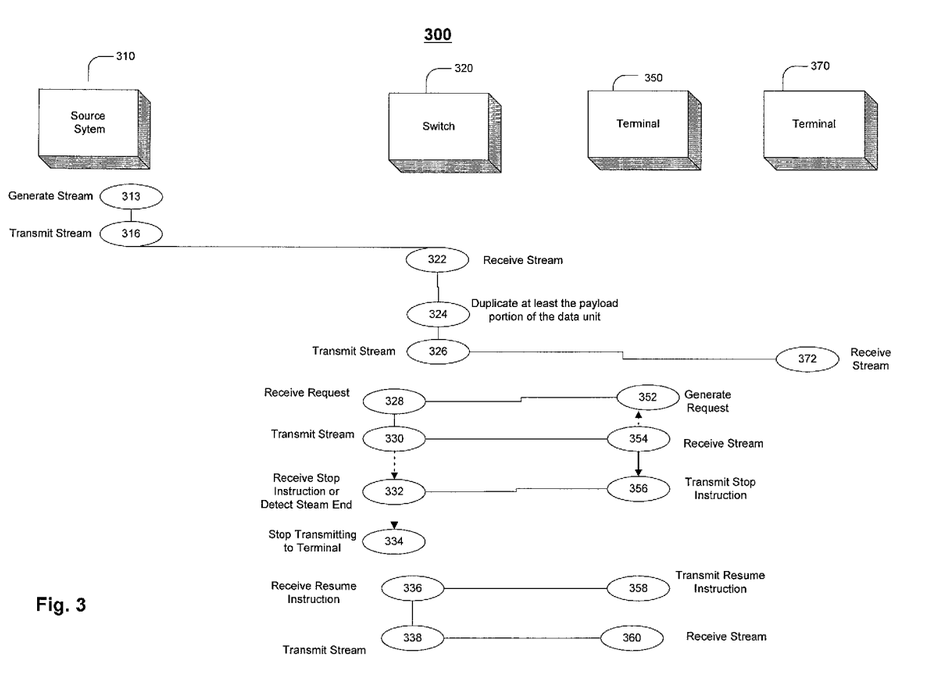
FIG. 3 is a flowchart illustrating a method of transmitting data units in a communications system, such the communications system of FIG. 1.

FIG. 3 illustrates a method of transmitting a flow of data units in a communications system 300. Communications system 300 generally includes a source system 310, a switch 320, and terminals 350 and 370. Generally, source system 310 corresponds to the source system 110 in FIG. 1, switch 320 corresponds to the switch 130 in FIG. 1, and terminals 350 and 370 correspond to components of the terminal 150 in FIG. 1.

Initially, source system 310 generates or enables access to a stream of data units in response to a request or otherwise (step 313). When the stream is derived from an analog input (e.g., analog audio or analog video), this may include converting the input into a stream of data units. Even if the input already is in digital form, enabling access to a stream of data units may involve reformatting the input into an appropriately formatted stream of data units. The stream of data units may include a variety of media streams (e.g., video, audio, images, text, and chat). Typically, the data units are IP (Internet Protocol) packets for transmission across the Internet. The source system 310 then transmits the generated stream of data units to one or more switches 320 (e.g., across network 120) (step 316).

When the switch 320 receives the data units from the source system 310 (step 322), it typically buffers and duplicates at least the payload portions of the data units (step 324). In some implementations, data unit attributes may be removed before buffering the payload. For example, for communications over the Internet, switch 320 may remove the IP header information and store only the payload and/or information represented by the payload. As the data unit is being transmitted to terminals, switch 320 modifies the existing header or adds a new IP header to the payload. The switch may use destination information corresponding to the IP address of the destination terminals (e.g., terminals 350 and 370) or an intermediary between switch 320 and the destination terminals as the destination information. With the newly acquired destination information, the switch 320 transmits the IP packets across the network (e.g., network 140 in FIG. 1) to the appropriate terminal, for example, terminal 370 in FIG. 3 (step 326).

The terminal 370 receives the stream of data units sent by the switch 320 across the network (step 372) and converts the data units into a perceivable output, manipulates the data units, or forwards the data units to another device. For example, a terminal 370 may receive a stream of IP data units containing video content and display or otherwise manipulate the video content on a personal computer or other device.

In some implementations, terminals may be capable of requesting a stream. For example, in FIG. 3, although terminal 370 is shown as automatically receiving a stream of data units (step 372), terminal 350 may be capable of generating a request to receive the stream of data units (step 352). When the switch 320 receives the request (step 328), it may transmit one or more streams of data units to terminal 350 (step 330). Terminal 350 then receives the transmitted streams of data units (step 354).

In some implementations, the switch 320 and the terminals 350 and 360 may be required to communicate periodically to maintain streaming. For example, a terminal 350 may send a "keep stream alive" message every 10 seconds to indicate that the terminal 350 wishes to receive a stream during its transmission.

While receiving a stream (step 354), the terminal 350 may request another stream (step 352) or may request termination of transmission by transmitting a request to stop sending the stream of data units (step 356). Upon receipt of a termination request or upon detection of the conclusion of the stream (step 332), the switch 320 stops transmitting the stream of data units (step 334).

Terminal 350 may elect to resume transmission of the stream of data units and may communicate this election to switch 320 (step 358). When the switch 320 receives a resume instruction (step 336), the switch resumes transmission of the stream (step 338) for receipt by the terminal 350 (step 360).

In some implementations, when the switch 320 receives a stream of IP data units from source system 310, the switch 320 may duplicate the payload portion of the data unit, and may modify or replace the IP destination address of the IP data units to specify the IP addresses of one or more conference terminals.

Typically, the switch 320 may duplicate any particular payload or all payloads more than once such that the payload of a received data unit is transmitted as the payload in several or all data units generated by the switch 320. Moreover, the switch 320 may receive a data unit and transmit the payload as two or more data units.

Conversely, the switch 320 may receive and combine more than one data unit and transmit the combined payloads of the multiple data units in a single data unit, or the switch 320 may divide the payload of a received data unit and combine the divided portions with the payloads of two or more other received data units.

As will be described with respect to FIG. 4, since the payloads are buffered, the switch 320 may produce several instantiations of the buffered payload, simultaneously, with or without offset, and may transmit those different instantiations to the same or different terminals as needed. These instantiations may be streamed to different time offsets so that terminal 350 may be listening to a stream of data units at a different point than terminal 370. For example, terminal 350 may be receiving the same song on an Internet radio station as terminal 370, but terminal 350 may be receiving data units that correspond to the song thirty (30) seconds later in time.

Figure 4:
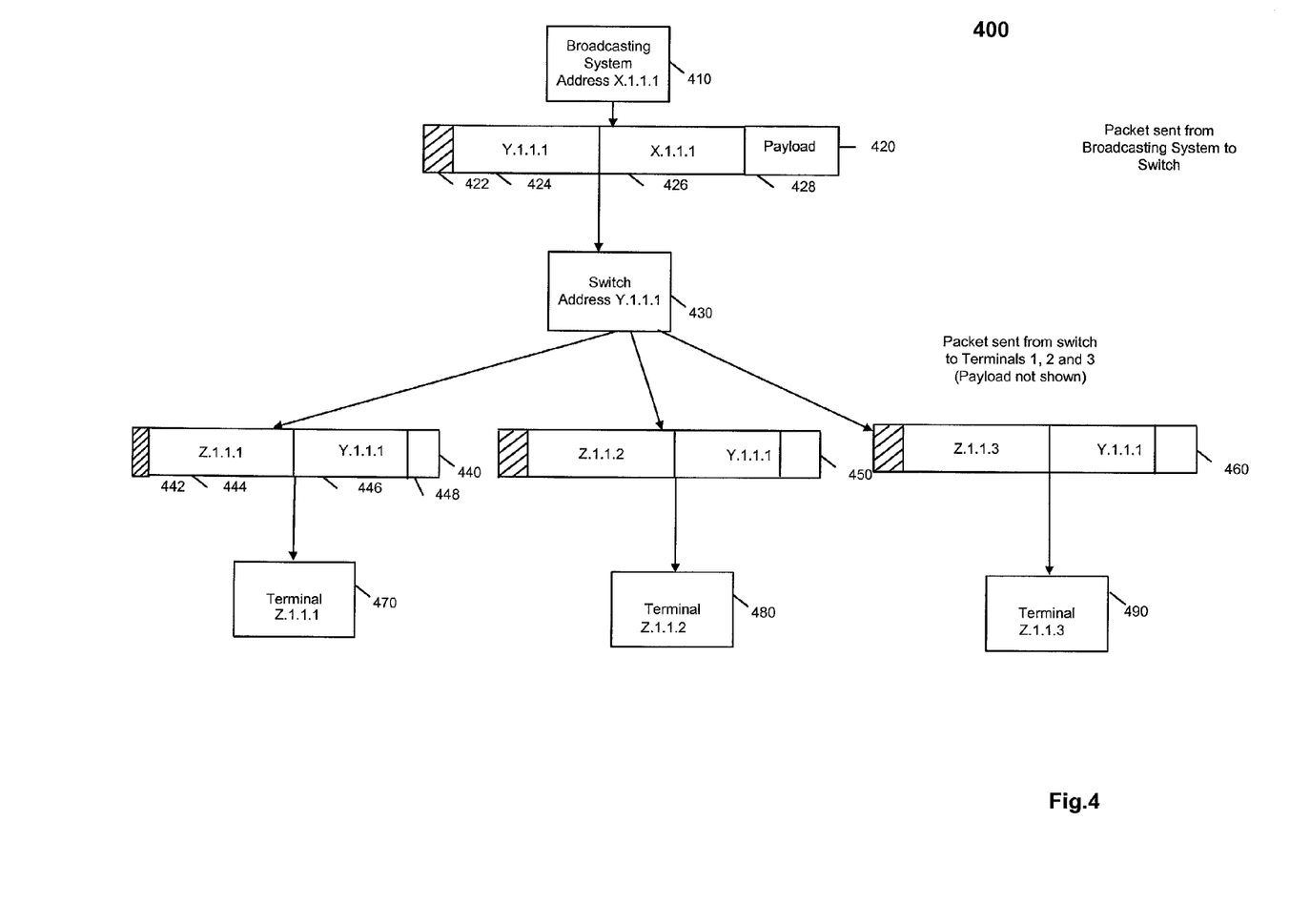
FIG. 4 is a flowchart illustrating movement of an IP packet through the communications system of FIG. 1.

FIG. 4 illustrates one example of the flow of IP data units from a source system 410 to terminals 470, 480 and 490. The source system 410 with an IP address of X.1.1.1 transmits an IP packet 420 to the switch 430 with a destination address of Y.1.1.1. The IP packet 420 includes the switch address as a destination address 424 and the source system address as a source address 426. The IP packet 420 also may include other header information 422 and a payload 428.

The switch 430, with a source address of Y.1.1.1, duplicates at least the payload 428 of the IP packet 420 and transmits an IP data unit 440 to terminal 470 with an address of Z.1.1.1. The IP data unit 440 includes the source IP address 446 of the switch 430 with a destination address 444 of terminal 470. The IP data unit 440 may include additional header information 442 and a payload 448. Similar activities take place to generate IP data units 450 and 460 for terminals 480 and 490.

Other implementations are within the scope of the following claims. For instance, implementations may include a manager requesting transmission of the stream to the terminals. The manager may include a network operator, a managing server, a workstation, or a scheduling agent. For example, a managing workstation may request transmission of the stream of data units to terminals beginning at a certain time.

Implementations also may include storing more than one instance in the stream of data units in the buffer. For example, the switch may store more than one copy of the stream to accommodate large numbers of requests. In another example, the stream may buffer the same stream of data units at two different spots.

Implementations also may include having the switch maintain state information on one or more requesting users. For example, the switch may establish or assist other devices in establishing a profile for the terminal that receives the stream of data units. In this manner, the switch leverages information available to network processors and devices, which may not ordinarily be accessible to servers, in establishing profiles.

Still further, implementations may include monitoring switch access and usage levels. For example, the switch may determine that the switch is operating at 85% of maximum performance in a given metric (e.g., processor use, memory use, number of users, bandwidth).

Implementations may include translating or transcoding content between different formats. For example, the switch may adjust transmission of packets to minimize the bandwidth consumed. In another example, the switch may convert a proprietary video-encoding format to a standards-based encoding format.

Implementations also may include inserting one or more pieces of content in an existing stream of data units. For example, the switch may insert video stream advertisements in a transmission of other video content. The inserted video content may reside on the switch, or it may be accessed from another device distinct from the switch that is transmitting the stream of data units. Implementations of inserting content may include creating tags associate with certain pieces of content being replicated. For example, the switch may be replicating a television show with commercials tagged in the video content periodically. Upon receiving the tag, the switch may stop transmitting the television show and access a series of advertisements. Implementations may include having the tag designate which advertisement to access. For example, the tag may indicate the device on which the advertisement is located. Implementations of tags also may enable accessing more than one selection of advertisements. The selection of advertisements may depend on one or more variables including, but not limited to, terminal information and profiling, the state of the network and other factors.

In addition, implementations may include inserting content based on information maintained about the user profile and user state. For example, the switch may determine that a terminal is at a suitable point in a content piece to receive an inserted advertisement for users with a particular profile.

What is claimed is:

1. A method of transmitting packets, the method comprising:
   using a switch to receive communications;
   using the switch to selectively filter the communications;
   using the switch to receive a first stream of data units that are addressed to a unicast address on the switch, wherein the first stream of data units includes a payload portion and an attribute portion;
   using the switch to duplicate at least the payload portion of a data unit within the first stream of data units;
   using the switch to enable access to the duplicated payload portion of the data unit by two or more terminals; and
   forwarding the duplicated payload portion of the data unit within a second stream of data units addressed to a unicast address on each of the two or more terminals,
   wherein the selectively filtering and forwarding are performed by the switch that is structured and arranged to selectively filter and forward between different domains at a same level in a protocol stack.

2. The method of claim 1 wherein the data unit includes an Internet Protocol packet.

3. The method of claim 2 wherein the attribute portion of the data unit includes an Internet Protocol header.

4. The method of claim 1 wherein the attribute portion of the data unit specifies one or more pieces of layer three information.

5. The method of claim 1 further comprising using the switch to generate and associate different attribute portions with duplicates of the payload portion generated by the switch.

6. The method of claim 5 wherein using the switch to associate different attribute portions with the data unit and duplicates of the payload portion includes specifying destination information that differs among the duplicates of the payload portion.

7. The method of claim 5 wherein using the switch to generate and associate different attribute portions includes changing an IP destination address.

8. The method of claim 7 wherein changing the IP destination address includes changing the IP destination address to an IP address corresponding to one or more terminals to which access to the payload portion will be enabled.

9. The method of claim 1 wherein using the switch to duplicate at least the payload portion includes duplicating only the payload portion of the data unit.

10. The method of claim 1 wherein using the switch to duplicate includes using the switch to duplicate the payload portion and the attribute portion.

11. The method of claim 1 wherein using the data unit includes audio content.

12. The method of claim 1 wherein the data unit includes video content.

13. The method of claim 1 wherein the data unit includes streamed media.

14. The method of claim 1 further comprising receiving a request to receive the stream of data units from at least a requesting one of the two or more terminals.

15. The method of claim 14 wherein using the switch to enable access to the payload portions of the data units includes enabling access to the at least one requesting terminal in response to the request.

16. The method of claim 14 wherein the request is received from a device other than the terminals.

17. The method of claim 1 wherein
using the switch to receive the first stream of data units,
using the switch to duplicate at least the payload portion of a data unit within the stream of data units,
using the switch to enable access to the duplicated payload portion of the data unit by two or more terminals, and
forwarding the duplicated payload portion of the data unit as the second stream of data units includes:
using the switch to receive the first stream of data units on a first communications interface associated with a first domain;
using the switch to duplicate at least the payload portion of a data unit so that the payload portion may be accessed from a second communications interface in at least a second domain different than the first domain;
using the switch to enable access to the duplicated payload portion from the communications interface; and
forwarding the duplicated payload portion of the data unit as the second stream of data units addressed to a unicast address for each of the two or more terminals using the second communications interface.

18. The method of claim 17 further comprising:
enabling the switch to receive a request from at least one of the terminals; and
transmitting the duplicated payload portion of the data unit as the second stream of data units uniquely addressed to each of to two or more terminals in response to receiving the request.

19. The method of claim 1 further comprising using the switch to store at least a first and second instance of the payload so that the second instance of the payload portion may be used to enable access to the duplicated payload portion when the first instance is no longer able to enable access to the duplicated payload portion.

20. The method of claim 19 wherein using the switch to store the second instance is performed in response to a large number of requests.

21. A switch comprising:
a first communications interface that is structured and arranged to:
receive communications,
selectively filter the communications, and
receive a first stream of one or more data units that are addressed to a unicast address on the switch, wherein each data unit includes a payload portion and an attribute portion;
a buffer structured and arranged to store at least the payload portions of the data units included in the received stream;
a replicator structured and arranged to duplicate at least the payload portions of one or more of the data units; and
a second communications interface structured and arranged to:
enable access by two or more terminals to the payload portions that are duplicated by the replicator, and
forward the duplicated payload portion of the data unit within a second stream of data units that are addressed to a unicast address on each of the two or more terminals; and
wherein the first communications interface and the second communications interface are structured and arranged to selectively filter and forward between different domains at a same level in a protocol stack.

22. The switch of claim 21 wherein a data unit includes an Internet Protocol packet.

23. The switch of claim 21 wherein the attribute portion of a data unit specifies one or more pieces of layer three information.

24. The switch of claim 21 further comprising a processor structured and arranged to generate and associate different attribute portions with the payload portions that are duplicated by the replicator.

25. The switch of claim 24 wherein the processor is structured and arranged to specify destination information that differs among different duplicated versions of a payload portion.

26. The switch of claim 24 wherein the processor is structured and arranged to change an IP destination address.

27. The switch of claim 26 wherein the processor is structured and arranged to change the IP destination address to an IP address corresponding to the terminal to which access to the payload portion will be enabled using the second communications interface.

28. The switch of claim 21 wherein the replicator is structured and arranged to duplicate the payload portion and the attribute portion.

29. The switch of claim 21 wherein the data unit includes audio content.

30. The switch of claim 21 wherein the data unit includes video content.

31. The switch of claim 21 wherein the data unit includes streamed media.

32. The switch of claim 21 further comprising a third communications interface structured and arranged to receive a request to receive the stream of data units from at least a requesting one of the two or more terminals.

33. The switch of claim 32 wherein the second communications interface is structured and arranged to enable access by the at least one requesting terminal to the payload portions in response to the request.

34. The switch of claim 32 wherein the requestor includes a device other than the terminals.

35. The switch of claim 21 wherein the second communications interface transmits the duplicated stream of data units to two different terminals.

36. The switch of claim 35 wherein the two different terminals receive the stream of data units at two different temporal offsets.

37. The switch of claim 21 wherein the replicator includes more than one pointer to contents of the buffer to enable a first terminal to receive the stream of data units at a different point in the stream of data units than a second terminal.

38. The switch of claim 21 wherein the buffer includes more than one instance of the stream of data units.

39. The switch of claim 21 wherein the replicator is structured and arranged to duplicate only the payload portion of the data unit.

40. A method of receiving a second stream of data units, the method including:
interfacing with a network including a switch capable of:
receiving communications,
filtering the communications, and
duplicating a first stream of data units that are addressed to a unicast address on the switch as a second stream of data units and forwarding the second stream of data units addressed to a unicast address on each of more than one terminal;

receiving the second stream of data units from the switch, wherein the data units within the stream each include a payload portion that has been duplicated by the switch and an attribute portion; and wherein selectively filtering and forwarding are performed by the switch that is structured and arranged to selectively filter and forward between different domains at a same level in a protocol stack.

41. The method of claim 40 further comprising generating perceivable output based on the stream of data units.

42. The method of claim 40 wherein the attribute portion of the data unit includes an IP header.

43. The method of claim 40 wherein the attribute portion of the data unit specifies one or more pieces of layer three information.

44. The method of claim 40 wherein the data unit includes audio content.

45. The method of claim 40 wherein the data unit includes video content.

46. The method of claim 40 wherein the data unit includes streamed media.

47. The method of claim 40 further comprising generating a request to receive the stream of data units.

48. The method of claim 47 wherein the payload portions of the data units are received in response to the request.

49. A method of distributing data units to terminals, the method comprising:

interfacing with a network including one or more switches capable of:
receive communications,
selectively filtering the communications, and
duplicating at least a payload portion of a data unit within a first stream of data units addressed to a unicast address on the switch, wherein each of the data units includes an attribute portion and the payload portion;

transmitting the first stream of data units to the switches for duplication of at least the payload portion of the data unit within the stream for forwarding as a second stream of data units addressed to a unicast address for two or more terminals; and wherein selectively forwarding and filtering are performed by the switches that are structured and arranged to selectively filter and forward between different domains at a same level in a protocol stack.

50. The method of claim 49 wherein the data unit includes audio content.

51. The method of claim 49 wherein the data unit includes video content.

52. The method of claim 49 wherein the data unit includes streamed media.

53. The method of claim 49 wherein the attribute portion of the data unit includes an IP header.

54. The method of claim 49 wherein the attribute portion of the data unit specifies one or more pieces of layer three information.

55. A switch comprising:

first communications interface means for:
receiving communications,
selectively filtering the communications, and
receiving a first stream of one or more data units addressed to a unicast address on the switch, wherein each data unit includes a payload portion and an attribute portion;

buffer means for storing at least the payload portion of the data units included in the received streams;

replicator means for duplicating at least the payload portion of one or more of the data units;

second communications interface means for:
enabling access by two or more terminals to the payload portions that are duplicated by the replicator;
forwarding the duplicated payload portion of the data unit within a second stream of data units addressed to a unicast address for each of the two or more terminals, wherein the switch is structured and arranged to selectively filter and forward between different domains at a same level in a protocol stack.

56. A system comprising:

a source system structured and arranged to enable access to a first stream of data units;

a switch structured and arranged to:
using a switch to receive communications,
using the switch to selectively filter the communications,
receive a first stream of data units addressed to a unicast address on the switch from a source system,
duplicate at least a payload portion of the data units in the stream, and to
forward payload portions duplicated to two or more terminals as a second stream of data units address to a unicast address for each of the terminals;

one or more terminals structured and arranged to receive a stream of data units that have been duplicated by the switch; and wherein the switch is structured and arranged to selectively filter and forward between different domains at a same level in a protocol stack.

* * * * *